United States Patent [19]

Oberneder et al.

[11] Patent Number: 6,011,112
[45] Date of Patent: Jan. 4, 2000

[54] ORGANOPOLYSILOXANE COMPOUNDS CROSS-LINKABLE BY CLEAVING OF ALCOHOLS TO FORM ELASTOMERS

[75] Inventors: Stefan Oberneder; Michael Stepp, both of Burghausen; Erich Pilzweger, Julbach; Norman Dorsch, Burghausen, all of Germany

[73] Assignee: Wacker-Chemie GmbH, Munich, Germany

[21] Appl. No.: 09/043,399

[22] PCT Filed: Sep. 26, 1996

[86] PCT No.: PCT/EP96/04210

§ 371 Date: Mar. 23, 1998

§ 102(e) Date: Mar. 23, 1998

[87] PCT Pub. No.: WO97/12939

PCT Pub. Date: Apr. 10, 1997

[30] Foreign Application Priority Data

Sep. 29, 1995 [DE] Germany ................ 195 36 410

[51] Int. Cl.[7] ........................................... C08K 5/34
[52] U.S. Cl. ........................ 524/718; 524/719; 528/18
[58] Field of Search ........................... 524/718, 719; 528/18

[56] References Cited

U.S. PATENT DOCUMENTS

| 4,395,526 | 7/1983 | White et al. . |
|---|---|---|
| 4,417,042 | 11/1983 | Dziark . |
| 4,467,063 | 8/1984 | Lockhart . |
| 4,517,337 | 5/1985 | Lockhart et al. . |
| 4,797,439 | 1/1989 | Peccoux . |
| 4,801,673 | 1/1989 | Bosch et al. . |
| 4,942,211 | 7/1990 | Sommer et al. . |

FOREIGN PATENT DOCUMENTS

| 0236042 | 9/1987 | European Pat. Off. . |
|---|---|---|
| 0499407 | 8/1992 | European Pat. Off. . |
| 2603893 | 3/1988 | France . |
| 3624206 | 2/1988 | Germany . |
| 3801389 | 7/1989 | Germany . |

*Primary Examiner*—Robert Dawson
*Assistant Examiner*—Jeffrey B. Robertson
*Attorney, Agent, or Firm*—Brooks & Kushman P.C.

[57] ABSTRACT

The invention relates to organopolysiloxane compounds which can be stored subject to the exclusion of moisture, can be cross-linked by cleaving of alcohols to form elastomers when moisture gains access at room temperature and are based on (A) polydiorganosiloxanes with organyloxy groups, optionally (B) organyloxy functional cross-linkers with at least three organyloxy groups, and optionally (C) condensation catalysts, characterised in that they contain at least one (D) compound selected from the compounds ($D_a$) to ($D_f$) given in claim 1.

10 Claims, No Drawings

ORGANOPOLYSILOXANE COMPOUNDS CROSS-LINKABLE BY CLEAVING OF ALCOHOLS TO FORM ELASTOMERS

TECHNICAL FIELD

The invention relates to organopolysiloxane compositions which can be stored in the absence of moisture and which cure to form elastomers in the presence of moisture at room temperature with the elimination of alcohols, said compositions being distinguished by a particularly high storage stability.

BACKGROUND OF THE INVENTION

In the context of the present invention, the term organopolysiloxanes is intended to include dimeric, oligomeric and polymeric siloxanes.

organopolysiloxane compositions which can be stored in the absence of moisture and which crosslink in the presence of moisture at room temperature with the elimination of alcohols are called RTC 1-alkoxy compositions and have been known for a long time. They consist essentially of silicone polymer with organyloxy end groups, crosslinking agent with at least three hydrolyzable groups, catalyst and, if appropriate, additives. This advantage of these RTC 1-alkoxy systems is that, in the crosslinking process, they only release odorless, neutral, non-polluting cleavage products—namely alcohols.

A substantial disadvantage of RTC 1-alkoxy compositions is the reduced storage stability compared with the corresponding acetic, oxime and amine systems. This means that although the RTC 1-alkoxy composition cures to form in elastomer in the desired manner after preparation, these curing properties usually disappear when the compositions are stored in the absence of air. After a prolonged storage time, therefore, the curing time to form elastomers is generally observed to be longer and the mechanical properties of said elastomers are markedly poorer than those of the original elastomers. In the worst case, the compositions may completely fail to cure to form elastomers after storage. The reason for this change in curing with time is often the equilibration of polymer chains with free alcohol dissolved in the composition, under catalysis by the metalorganic condensation catalyst; this generates polymer ends with an alkoxy group which are too unreactive to react further and give a network under the applied conditions (room temperature). Crosslinking does not therefore take place. The alcohol for this undesired equilibration reaction is produced from the reaction of the alkoxy crosslinking agent with water and other OH groups, e.g. silanol groups, which, in the preparation of RTC 1-alkoxy compositions, unavoidably enter the composition via the polymer, the filler and other possible additives and via the method of preparation (reaction vessel, preparation in the atmosphere). There have therefore already been numerous attempts to prevent the described change in the curing properties of RTC 1-alkoxy compositions on storage. In this connection, reference may be made, for example, to EP-A 236 042 (Dow Corning Corp.; issued on Sep. 09, 1987) and DE-A 38 01 389 (Wacker-Chemie GmbH; issued on Jul. 27 1989) or corresponding U.S. Pat. No. 4,942,211.

Furthermore U.S. Pat. No. 4,395,526 (General Electric Co.; issued on Jul. 26, 1983) claims silanes of the formula $(R^1O)_{4-a-b}SiR^2{}_bX_a$, in which $R^1$ and $R^2$ are hydrocarbon radicals, X is a hydrolyzable group selected from amido, amino, carbamato, enoxy, imidato, isocyanato, oximato, thioisocyanato and ureido radicals, a is equal to 1 to 4, b is equal to 0 to 3 and a+b is equal to 1 to 4.

U.S. Pat. No. 4,417,042 (General Electric Co.; issued on Nov. 22, 1983) describes Si—N-containing compounds in crosslinkable compositions, selected from the group of silanes of the formula $YR^3{}_2Si$—$NR^3$—$SiR^3{}_2Y$, in which $Y=R^3$ or $R^2{}_2$—N—, or polymers of 3–100 mol % of $R^2{}_2N$—$SiR^3{}_2$—O—, $R^2{}_2N$—$SiR^3{}_2$—$NR^2$—, $R^2{}_3Si$—$NR^2$—, —$SiR^3{}_2$—$NR^2$—, =$SiR^3$—$NR^2$—or —Si—$NR^2$—units and 0–97 mol % of $R^3{}_cSiO_{(4-c)/2}$, in which c=0, 1, 2 or 3.

U.S. Pat. No. 4,467,063 (General Electric Co.; issued on Aug. 21, 1984) discloses the use of N-silyl-substituted imidazoles $R_{4-a}SiIm_a$, in which a=1, 2, 3 or 4, in crosslinkable compositions.

SUMMARY OF THE INVENTION

The present invention provides organopolysiloxane compositions which can be stored in the absence of moisture and which are crosslinkable to form elastomers in the presence of moisture at room temperature with the elimination of alcohols, said compositions being based on (A) polydiorganosiloxanes with at least two organyloxy radicals on each end group, if appropriate (B) organyloxy-functional crosslinking agents with at least three organyloxy groups and if appropriate (C) condensation catalysts, and containing at least one compound (D) selected from ($D_a$) compounds of the general formula

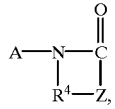

(Ia)

($D_b$) compounds with a substituted or unsubstituted 1,2, 4-triazol-1-yl radical of the formula

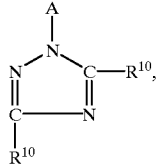

(Ib)

($D_c$) compounds with a substituted or unsubstituted piperazinediyl radical of the formula

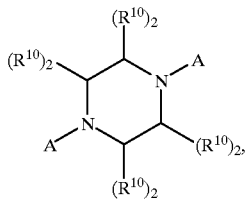

(Ic)

($D_d$) O-silylated substituted or unsubstituted hydroxypyrimidines, (D$_e$) compounds of the formula

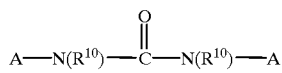

(Ie)

and (D$_f$) silylated substituted or unsubstituted hydroxypurines, in which

Z is =N—A or —O—,

R$^4$ is a divalent hydrocarbon radical having 1 to 16 carbon atoms which is unsubstituted or substituted by halogen atoms, amino groups, ether groups or ester groups, A are identical or different radicals 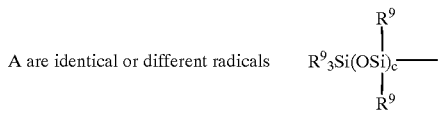

in which R$^9$ can be identical or different and are SiC-bonded monovalent hydrocarbon radicals having 1 to 12 carbon atoms which are unsubstituted or substituted by halogen atoms, amino groups, ether groups, ester groups, epoxy groups, mercapto groups, cyano groups or (poly)glycol radicals, the latter being made up of oxyethylene and/or oxypropylene units, or an organosiloxy radical and c is 0 or an integer from 1 to 20, and R$^{10}$ can be identical or different and is a hydrogen atom or hydrocarbon radicals having 1 to 8 carbon atoms which are unsubstituted or substituted by halogen atoms, amino groups, ether groups or ester groups.

The compositions according to the invention can be rigid or flowable, depending on their application.

DESCRIPTION OF THE PREFERRED EMBODIMENTS

The polydiorganosiloxanes with at least two organyloxy radicals on each end group, used according to the invention, are preferably those of the general formula

in which a is 0 or 1,

R are identical or different SiC-bonded hydrocarbon radicals having 1 to 18 carbon atoms which are unsubstituted or substituted by halogen atoms, amino groups, ether groups, ester groups, epoxy groups, mercapto groups, cyano groups or (poly)glycol radicals, the latter being made up of oxyethylene and/or oxypropylene units, R$^1$ can be identical or different and are a hydrogen atom or have one of the meanings indicated for R, R$^2$ can be identical or different and are a hydrocarbon radical having 1 to 18 carbon atoms which is unsubstituted or substituted by amino, ester, ether, keto or halogen groups and which can be interrupted by oxygen atoms, and n is an integer from 10 to 10,000, preferably 100 to 3000 and particularly preferably 400 to 2000.

Examples of hydrocarbon radicals R and R$^1$ are alkyl radicals such as the methyl, ethyl, n-propyl, isopropyl, 1-n-butyl, 2-n-butyl, isobutyl, tert-butyl, n-pentyl, isopentyl, neopentyl and tert-pentyl radicals; hexyl radicals such as the n-hexyl radical; heptyl radicals such as the n-heptyl radical; octyl radicals such as the n-octyl radical and isooctyl radicals like the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; alkenyl radicals such as the vinyl and allyl radicals; cycloalkyl radicals such as the cyclopentyl, cyclohexyl, cycloheptyl and methylcyclohexyl radicals; aryl radicals such as the phenyl, naphthyl, anthryl and phenanthryl radicals; alkaryl radicals such as the o-, m- and p-tolyl radicals, xylyl radicals and ethylphenyl radicals; and aralkyl radicals such as the benzyl radical and the α- and β-phenylethyl radicals.

Examples of substituted hydrocarbon radicals R and R$^1$ are halogenated radicals such as the 3-chloropropyl radical, the 3,3,3-trifluoropropyl radical, chlorophenyl radicals, hexafluoropropyl radicals like the 1-trifluoromethyl-2,2,2-trifluoroethyl radical; the 2-(perfluorohexyl)ethyl radical, the 1,1,2,2-tetra-fluoroethoxypropyl radical, the 1-trifluoromethyl-2,2,2-trifluoroethoxypropyl radical, the perfluoroisopropoxyethyl radical and the perfluoroisopropoxypropyl radical; radicals substituted by amino groups, such as the N-(2-aminoethyl)-3-aminopropyl radical, the 3-aminopropyl radical and the 3-(cyclohexylamino)propyl radical; ether-functional radicals such as the 3-methoxypropyl radical and the 3-ethoxypropyl radical; cyano-functional radicals such as the 2-cyanoethyl radical; ester-functional radicals such as the methacryloxypropyl radical; epoxy-functional radicals such as the glycidoxypropyl radical, and sulfur-functional radicals such as the 3-mercaptopropyl radical.

Preferred radicals R are unsubstituted hydrocarbon radicals having 1 to 10 carbon atoms and hydrocarbon radicals having 1 to 10 carbon atoms which are substituted by amino groups or fluorine radicals, the methyl radical being particularly preferred.

The radical R$^1$ is preferably a hydrogen atom, an unsubstituted hydrocarbon radical having 1 to 10 carbon atoms or a substituted hydrocarbon radical having 1 to 10 carbon atoms which is substituted by amino, mercapto, morpholino, glycidoxy, acryloxy or methacryloxy groups.

The radical R$^1$ is particularly preferably an alkyl radical or alkenyl radical having 1 to 4 carbon atoms, especially the methyl, ethyl or vinyl radical, or a substituted or unsubstituted amino or glycidoxy group bonded to the silicon atom via alkylene radicals having 2 to 6 carbon atoms.

Examples of unsubstituted hydrocarbon radicals R$^1$ are the hydrocarbon radicals indicated for R.

Examples of substituted hydrocarbon radicals R$^1$ are the 3-(2-aminoethylamino)propyl radical, the 3-(cyclohexylamino)propyl radical, the 3-(glycidoxy)propyl radical, the 3-(N,N-diethyl-2-aminoethylamino)propyl radical, the 3-(butylamino)propyl radical and the 3-(3-methoxypropylamino)propyl radical.

The radical R$^2$ is preferably an alkyl radical having 1 to 8 carbon atoms which can be substituted by methoxy or ethoxy groups, methyl or ethyl radicals being particularly preferred.

Examples of alkyl radicals R$^2$ are the examples of alkyl radicals indicated above for R.

The average value of the number n in the formula (II) is preferably chosen so that the organopolysiloxane of the formula (II) has a viscosity of 1000 to 1,000,000 mm$^2$/s and particularly preferably of 5000 to 500,000 mm$^2$/s, measured in each case at a temperature of 25° C.

Although not indicated in the formula (II) and not inferable from the name polydiorganosiloxane, up to 10 mole percent of the diorganosiloxane units can be replaced with other siloxane units such as $R_3SiO_{1/2}$, $RSiO_{3/2}$ and $SiO_{4/2}$ units, R being defined as indicated above, although said units are usually present only as impurities which are more or less difficult to avoid.

Examples of the polydiorganosiloxanes with at least two organyloxy radicals on each end group (A), used in the compositions according to the invention, are
$(MeO)_2MeSiO[SiMe_2O]_{200-2000}SiMe(OMe)_2$,
$(EtO)_2MeSiO[SiMe_2O]_{200-2000}SiMe(OEt)_2$,
$(MeO)_2ViSiO[SiMe_2O]_{200-2000}SiVi(OMe)_2$,
$(EtO)_2ViSiO[SiMe_2O]_{200-2000}SiVi(OEt)_2$,
$(MeO)_2CapSiO[SiMe_2O]_{200-2000}SiCap(OMe)_2$,
$(MeO)_2BapSiO[SiMe_2O]_{200-2000}SiBap(OMe)_2$ and
$(EtO)_2BapSiO[SiMe_2O]_{200-2000}SiBap(OEt)_2$,
in which Me is the methyl radical, Et is the ethyl radical, Vi is the vinyl radical, Cap is the 3-(cyclohexylamino)propyl radical and Bap is the 3-(n-butylamino)propyl radical.

The organopolysiloxane (A) used according to the invention can be either a single type or a mixture of at least two types; of such organopolysiloxanes.

The polydiorganosiloxanes with at least two organyloxy radicals on each end group, used in the compositions according to the invention, are commercially available products or can be prepared by processes known in silicon chemistry, for example by reacting α,ω-dihydroxypolyorganosiloxanes with the appropriate organyloxysilanes.

The organyloxy-functional crosslinking agents (B) which may be used can be any organyloxy crosslinking agents known hitherto, for example silanes or siloxanes with at least three organyloxy groups or cyclic silanes according to DE-A 36 24 206 (Wacker-Chemie GmbH; issued on Feb. 11, 1988) or corresponding U.S. Pat. No. 4,801,673, of the formula

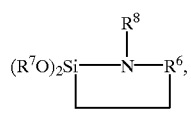

(III)

in which $R^6$ is a divalent hydrocarbon radical, $R^7$ can be identical or different and have one of the meanings indicated for $R^2$, and $R^8$ is a hydrogen atom or an alkyl or aminoalkyl radical.

The organyloxy crosslinking agents (B) which may be used in the compositions according to the invention are preferably organosilicon compounds of the formula

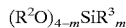 (IV), in which $R^2$ can be identical or different and have one of the meanings indicated above, $R^3$ has one of the meanings given above for $R^1$ or is a hydrocarbon radical substituted by the radical $—SiR^2_1(OR^2)_{3-b}$, in which $R^1$ and $R^2$ are as defined above and b is equal to 0, 1, 2 or 3, and m is 0 or 1, and their partial hydrolyzates.

Said partial hydrolyzates can be partial homohydrolyzates, i.e. partial hydrolyzates of one type of organosilicon compound of the formula (IV), or partial cohydrolyzates, i.e. partial hydrolyzates of at least two different types of organosilicon compounds of the formula (IV).

If the crosslinking agents (B) which may be used in the compositions according to the invention are partial hydrolyzates of organosilicon compounds of the formula (IV), they preferably have up to 6 silicon atoms.

Examples of the radical $R^3$ are the examples given above for the radical $R^1$ and hydrocarbon radicals having 1 to 6 carbon atoms which are substituted by radicals $—SiR^1_b(OR^2)_{3-b}$, in which b is equal to 0 or 1 and $R^2$ is as defined above.

Preferred radicals $R^3$ are the preferred radicals given for $R^1$ and hydrocarbon radicals having 1 to 6 carbon atoms which are substituted by radicals $—SiR^1_b(OR^2)_{3-b}$, in which b is equal to 0 or 1 and $R^2$ is as defined above.

Particularly preferred radicals $R^3$ are the particularly preferred radicals given for $R^1$ and hydrocarbon radicals having 2 carbon atoms which are substituted by radicals $—Si(OR^2)_3$, in which $R^2$ is the ethyl or methyl radical.

The crosslinking agents (B) which may be used in the compositions according to the invention are particularly preferably tetramethoxysilane, tetraethoxysilane, methyltrimethomysilane, methyltriethoxysilane, vinyltrimethoxysilane, vinyltriethoxysilane, phenyltrimethoxysilane, phenyltriethoxysilane, 3-aminopropyltrimethoxysilane, 3-aminopropyltrimethoxysilane, 3-cyanopropyltrimethoxysilane, 3-cyanopropyltriethoxysilane, 3-(2-aminoethylamino) propyltrimethoxysilane, 3-(2-aminoethylamino) propyltriethoxysilane, 3-(N,N-diethyl-2-aminoethylamino) propyltrimethoxysilane, 3-(N,N-diethyl-2-aminoethylamino)propyltriethoxysilane, 3-(cyclohexyl amino)propyltrimethoxysilane, 3-(cyclohexylamino) propyltriethoxysilane, 3-(glycidoxy)propyltriethoxysilane, 1,2-bis(trimethoxysilyl)ethane, 1,2-bis(triethoxysilyl)ethane and partial hydrolyzates of the alkoxy-functional organosilicon compounds mentioned, e.g. hexaethoxydisiloxane.

The crosslinking agent (B) which may be used according to the invention can be either a single type or a mixture of at least two types of such organyloxy crosslinking agents.

The crosslinking agents (B) used in the compositions according to the invention are commercially available products or can be prepared by processes known in silicon chemistry.

The compositions according to the invention contain crosslinking agents (B) in amounts preferably of 0 to 50 parts by weight, particularly preferably of 0.1 to 20 parts by weight and especially of 0.5 to 10 parts by weight, based in each case on 100 parts by weight of organopolysiloxane (A).

The compositions according to the invention can contain any condensation catalysts (C) which could also be present hitherto in compositions which can be stored in the absence of water and which crosslink to form elastomers in the presence of water at room temperature. They include all the condensation catalysts mentioned in DE-A 38 01 389 cited at the outset, for instance butyl titanates and organic tin compounds like di-n-butyltin diacetate, di-n-butyltin dilaurate and reaction products of a silane containing per molecule, as hydrolyzable groups, at least two monovalent hydrocarbon radicals bonded to silicon via oxygen and unsubstituted or substituted by an alkoxy group, or an oligomer of said silane, with a diorganotin diacylate, all the valencies of the tin atoms in these reaction products being saturated by oxygen atoms of the grouping

or by SnC-bonded monovalent organic radicals.

Preferred condensation catalysts (C) are metal-organic condensation catalysts, especially derivatives of titanium, aluminum and tin as well as calcium and zinc, dialkyltin compounds and zinc dicarboxylates being particularly preferred.

Examples of preferred metalorganic condensation catalysts are the dialkyldi(β-diketo) stannates, dialkyltin dicarboxylates, calcium and zinc dicarboxylates and butyltitanium chelate compounds described in U.S. Pat. No. 4,517,337 (General Electric Co.; issued on May 14 1985).

Examples of particularly preferred metalorganic condensation catalysts are dibutyltin diacetate, dibutyltin dilaurate, dibutyltin di(2-ethylhexanoate) and zinc di(2-ethylhexanoate).

The condensation catalysts (C) which may be used in the compositions according to the invention can be either a single type or a mixture of at least two types of such condensation catalysts.

The compositions according to the invention contain the condensation catalyst (C) in amounts preferably of 0 to 10 parts by weight, particularly preferably of 0.01 to 5 parts by weight and especially of 0.1 to 4 parts by weight, based in each case on 100 parts by weight of organopolysiloxane (A).

Examples of the radicals $R^4$ are the methylene, 1,2-ethylene, 1,3-propylene, 1,4-butylene, methyl-1,2-ethylene, 1-methyl-1,3-propylene, 2-methyl-1,3-propylene, 2,2-dimethyl-1,3-propylene and 2-ethyl-1,3-propylene radicals.

$R^4$ is preferably a radical $—(CR^5{}_2)_y—$, in which $R^5$ can be identical or different and are a hydrogen atom or a hydrocarbon radical having 1 to 4 carbon atoms and y is an integer from 1 to 8, preferably 2, 3 or 4, $R^4$ particularly preferably being the 1,2-ethylene radical and [sic] the 1,3-propylene radical.

The radical $R^5$ is particularly preferably a hydrogen atom or the methyl radical, especially a hydrogen atom. Examples of the radical $R^5$ are the examples of hydrocarbon radicals having 1 to 4 carbon atoms which are indicated above for R.

Examples of $R^9$ are the examples of substituted or unsubstituted hydrocarbon radicals having 1 to 12 carbon atoms which are indicated for R, and organosiloxy radicals such as the trimethylsiloxy radical, the triethylsiloxy radical, the dimethylphenylsiloxy radical, the $(CH_3)_3SiO—[Si(CH_3)_2O]_3$ radical and the $(CH_3)_3SiO—[Si(CH_3)_2O]_4$ radical.

$R^9$ is preferably a hydrocarbon radical having 1 to 12 carbon atoms and particularly preferably the methyl radical.

The value of c is preferably 0 or an integer from 1 to 10, particularly preferably 0 or an integer from 1 to 4 and especially 0.

Examples of the radical A are the trimethylsilyl radical, the triethylsilyl radical, the dimethylphenylsilyl radical, the dimethylvinylsilyl radical, the $(CH_3)_3Si[OSi(CH_3)_2]_3$ radical, the $(CH_3)_2(CH_2=CH)Si[OSi(CH_3)_2]_3$ radical, the $(CH_3)_3Si[OSi(CH_3)_2]_4$ radical and the [3-(N,N-diethylaminoethylamino)propyl](CH_3)_2Si$ $[OSi(CH_3)_2]_3$ radical.

The radical A is preferably the trimethylsilyl radical, the $(CH_3)_3Si[OSi(CH_3)_2]_3$ radical, the $(CH_3)_2—(CH_2=CH)Si$ $[OSi(CH_3)_2]_3$ radical and [sic] the $(CH_3)_3Si[OSi—(CH_3)_2]_4$ radical, the trimethylsilyl radical being particularly preferred.

Examples of $R^{10}$ are the examples of substituted or unsubstituted hydrocarbon radicals having 1 to 8 carbon atoms which are indicated for R.

The radical $R^{10}$ is preferably a hydrogen atom and [sic] a hydrocarbon radical having 1 to 6 carbon atoms, particularly preferably a hydrogen atom.

Examples of compounds ($D_a$) of the formula (Ia) in which Z is —O— are substituted or unsubstituted 3-trimethylsilyl-1,3-oxazolidin-2-ones, e.g. that of the formula

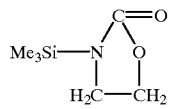

in which Me is the methyl radical.

Examples of compounds ($D_a$) of the formula (Ia) in which Z is =N—A are substituted or unsubstituted 1,3-bis (trimethylsilyl)imidazolidin-2-ones, e.g. that of the formula

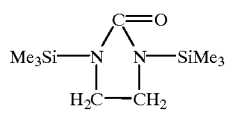

in which Me is the methyl radical.

Examples of compounds ($D_b$) of the formula (Ib) are substituted or unsubstituted 1-trimethylsilyl-1,2,4-triazoles, e.g. that of the formula

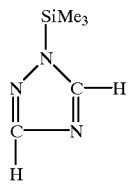

in which Me is the methyl radical.

Examples of compounds ($D_c$) of the formula (Ic) are substituted or unsubstituted 1,4-bis(trimethylsilyl) piperazines, e.g. that of the formula

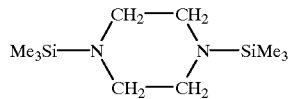

in which Me is the methyl radical.

Examples of O-silylated substituted or unsubstituted hydrocypyrimidines ($D_d$) are compounds of the formula (Id)

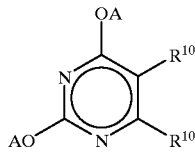

in which A and $R^{10}$ have one of the meanings given above, e.g. bis(O-trimethylsilyl)uracil, bis(O-trimethylsilyl) thymine and tris(O-trimethylsilyl)barbituric acid

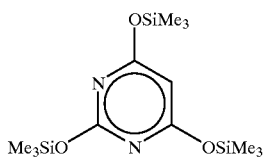

in which Me is the methyl radical.

Examples of compounds (D$_e$) of the formula (Ie) are substituted or unsubstituted N,N'-bis(trimethylsilyl) ureylenes, e.g. those of the formulae

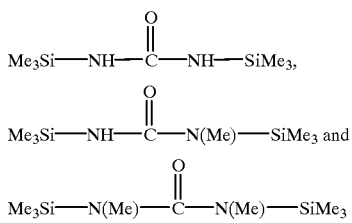

in which Me is the methyl radical.

Examples of silylated substituted or unsubstituted hydroxypurines (D$_f$) are tetrakis(trimethylsilyl)uric acid and compounds of the formula

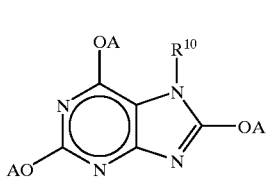

(If)

in which A and R$^{10}$ have one of the meanings given above, e.g. 2,6,8-tris(O-trimethylsilyl)uric acid

in which Me is the methyl radical.

If one of the compounds of the formulae (Ia) to (If) contains more than one radical A per molecule, the radicals A in this molecule preferably have the same meaning.

The component (D) used according to the invention is preferably N-trimethylsilyl-2-oxazolidinone, N,N-bis(trimethylsilyl) -2-imidazolidinone, (CH$_3$)$_2$(CH$_2$=CH)Si [OSi(CH$_3$)$_2$]$_3$—NH—CO—NH—[(CH$_3$)$_2$SiO]$_3$Si (CH=CH$_2$)(CH$_3$)$_2$ and [sic] (CH$_3$)$_3$Si—NH—CO—NH—Si(CH$_3$)$_3$.

The compounds (D$_a$) to (D$_f$) are commercially available products or can be prepared by processes described in the literature and commonly used in silicon chemistry.

The component (D) used in the compositions according to the invention can be either a single type or a mixture of at least two types of such compounds.

The compositions according to the invention contain the compound (D) in amounts preferably of 0.1 to 10 parts by weight, particularly preferably of 0.5 to 6 parts by weight and especially of 0.5 to 5 parts by weight, based in each case on 100 parts by weight of organopolysiloxane (A).

In addition to the components (A), (B), (C) and (D) described above, the compositions according to the invention can contain further substances such as plasticizers (E), fillers (F), coupling agents (G) and additives (H), it being possible for the additional substances (E) to (H) to be the same as those which have also been used hitherto in compositions crosslinkable with the elimination of alcohols.

Examples of plasticizers (E) are dimethylpolysiloxanes which are blocked with trimethylsiloxy end groups and are liquid at room temperature, and high-boiling hydrocarbons, e.g. paraffin oils.

The compositions according to the invention contain plasticizers (E) in amounts preferably of 0 to 300 parts by weight, particularly preferably of 10 to 200 parts by weight and especially of 20 to 100 parts by weight, based in each case on 100 parts by weight of organopolysiloxane (A).

Examples of fillers (F) are non-reinforcing fillers, i.e. fillers with a BET surface area of up to 50 m$^2$/g, such as quartz, diatomaceous earth, calcium silicate, zirconium silicate, zeolites, powdered metal oxides like aluminum, titanium, iron or zinc oxides or mixed oxides thereof, barium sulfate, calcium carbonate, gypsum, silicon nitride, silicon carbide, boron nitride and powdered glass and plastic like powdered polyacrylonitrile; reinforcing fillers, i.e. fillers with a BET surface area of more than 50 m$^2$/g, such as pyrogenic silicic acid, precipitated silicic acid, carbon black like furnace and acetylene black, and mixed silicon/aluminum oxides of large BET surface area; and fibrous fillers such as asbestos and plastic fibers. Said fillers may have been rendered hydrophobic, for example by treatment with organosilanes or organosiloxanes or with stearic acid, or by the etherification of hydroxyl groups to alkoxy groups.

The compositions according to the invention contain fillers (F) in amounts preferably of 0 to 300 parts by weight, particularly preferably of 1 to 200 parts by weight and especially of 5 to 200 parts by weight, based in each case on 100 parts by weight of organopolysiloxane (A).

Examples of the coupling agents (G) used in the organopolysiloxane compositions according to the invention are silanes and organopolysiloxanes with functional groups, such as those with aminoalkyl, glycidoxypropyl or methacryloxypropyl radicals, and tetraalkoxysilanes. However, if another component, such as the siloxane (A) or the crosslinking agent (B), already contains said functional groups, the addition of a coupling agent can be omitted.

The compositions according to the invention contain coupling agents (G) in amounts preferably of 0 to 50 parts by weight, particularly preferably of 1 to 20 parts by weight and especially of 1 to 10 parts by weight, based in each case on 100 parts by weight of organopolysiloxane (A).

Examples of additives (H) are pigments, dye-stuffs, perfumes, fungicides, antioxidants, agents for influencing the electrical properties, such as conductive carbon black, flame resistance agents, light stabilizers, agents for increasing the skin formation time, such as silanes with an SiC-bonded mercaptoalkyl radical, cell-forming agents, e.g. azodicarbonamide, heat stabilizers and thixotropic agents.

The compositions according to the invention contain additives (H) in amounts preferably of 0 to 100 parts by weight, particularly preferably of 0 to 30 parts by weight and especially of 0 to 10 parts by weight, based in each case on 100 parts by weight of organopolysiloxane (A).

The individual components (E), (F), (G) and (H) of the organopolysiloxane compositions according to the invention, crosslinkable with the elimination of alcohols, can each be either one type of such components or a mixture of at least two types of such components.

The compositions according to the invention preferably contain
(A) polydiorganosiloxane of the formula (II),
(B) crosslinking agent,
(C) condensation catalyst,
(D) one or more compounds selected from ($D_a$) to ($D_f$), and other substances if appropriate.

The compositions according to the invention particularly preferably consist of
(A) 100 parts by weight of polydiorganosiloxane of the formula (II),
(B) 0.1 to 50 parts by weight of crosslinking agent of the formula (IV),
(C) 0.01 to 10 parts by weight of metalorganic condensation catalyst,
(D) 0.1 to 10 parts by weight of a compound selected from ($D_a$) to ($D_f$),
(E) 0 to 300 parts by weight of plasticizers,
(F) 0 to 300 parts by weight of fillers,
(G) 0 to 50 parts by weight of coupling agents and
(H) 0 to 100 parts by weight of additives.

The compositions according to the invention can be prepared by mixing together all the components of the particular composition in any order. This mixing can take place at room temperature and at ambient atmospheric pressure, i.e. about 900 to 1100 hPa. If desired, however, this mixing can also take place at higher temperatures, e.g. at temperatures in the range 35° C. to 135° C.

The organopolysiloxane compositions according to the invention must be prepared and stored under essentially anhydrous conditions or the compositions may otherwise cure prematurely.

The normal water content of the air is sufficient to cross-link the compositions according to the invention to form elastomers. If desired, the cross-linking can also be carried out at higher or lower temperatures than room temperature, e.g. at –5° to 10° C. or at 30° to 50° C.

The orgranopolysiloxane compositions according to the invention, crosslinkable to form elastomers with the elimination of alcohols, have the advantageous characteristics of a very high storage stability and a high crosslinking rate. Thus, when stored for at least 18 months at room temperature, the compositions according to the invention exhibit constant vulcanization properties at all times.

The compositions according to the invention have the further advantage that the compounds ($D_a$) to ($D_f$) already react at room temperature with OH groups, especially with alcohol and/or water and/or Si—OH groups. In RTC alkoxy compositions, compounds with OH groups are principally water introduced into the composition with the formulation components, for instance the polysiloxane or the fillers, alcohols formed in the terminal blocking of the OH polymers and in the reaction of Si—OH groups or water with cross-linking agent, and Si—OH groups on polysiloxanes and, in particular, on the silicic acid which may be used as a filler. These processes advantageously release no ecologically harmful or foul-smelling, volatile cleavage products.

A further advantage of the compositions according to the invention is the fact that the compounds (D) used are readily obtainable synthetically and hence can be prepared economically.

The compositions according to the invention or prepared according to the invention can be used for all the same purposes as organopolysiloxane compositions which can be stored in the absence of water and which crosslink to form elastomers in the presence of water at room temperature.

The compositions according to the invention or prepared according to the invention are thus outstandingly suitable e.g. as sealing compounds for joints, including vertical joints, and similar gaps with a clear width of e.g. 10 to 40 mm, for example in buildings and landcraft, watercraft and aircraft, or as adhesives or mastics, e.g. in window construction or in the manufacture of aquaria or show cases, as well as e.g. for the production of protective coatings, including those for surfaces continuously exposed to the action of fresh water or seawater, or non-slip coatings, or for the manufacture of rubberlike moldings, and for the isolation of electrical or electronic devices.

In the Examples described below, all viscosity data refer to a temperature of 25° C. Unless indicated otherwise, the Examples below are carried out at ambient atmospheric pressure, i.e. at about 1000 hPa, at room temperature, i.e. at about 23° C., or at the temperature which is produced when the reactants are brought together at room temperature without additional heating or cooling, and at a relative atmospheric humidity of about 50%. Furthermore, unless indicated otherwise, all parts and percentages are by weight.

In the following Examples, the Shore A hardness is determined according to DIN (Deutsche Industrie Norm).

EXAMPLE 1

28 g of an α,ω-bis(trimethylsiloxy)polydimethylsiloxane with a viscosity of 0.1 mPa·s, 1.6 g of methyltrimethoxysilane and 1 g of 3-aminopropyltriethoxysilane (commercially available under the name "Silan GF 93" from Wacker-Chemie GmbH) are mixed with 53 g of an α,ω-bis(dimethoxymethyl)polydimethylsiloxane with a viscosity of 80,000 $mm^2/s$. 4 g of 3-trimethylsilyl-2-oxazolidinone (commercially available from ABCR, D-Karlsruhe) are then stirred into the composition and 0.3 g of dibutyltin diacetate (commercially available from Acima, CH-Buchs) is added. Finally, 12 g of pyrogenic surface-treated silicic acid with a BET specific surface area of 150 $m^2/g$ (commercially available under the tradename "WACKER HDK" H15 from Wacker-Chemie GmbH) are incorporated homogeneously into the composition.

The composition prepared in this way is filled into airtight tubes and stored at 50° C.

Immediately after preparation and after 2, 4, 8 and 12 weeks of storage,
a) extruded beads are used to determine the skin formation time (time up to the formation of a dry surface of the bead); this is done by determining the time which elapses between the application of the bead and the point at which, when the bead surface is touched with a pencil, the composition no longer adheres to the pencil; and
b) the Shore-A hardness is determined using 2 mm thick sheets; the sheets are produced by applying the composition in question to a polytetrafluoroethylene surface with a spatula and exposing it to atmospheric moisture. The dry film formed is tested two weeks after application.

The results are collated in Table 1.

EXAMPLE 2

The procedure described in Example 1 is repeated, except that 4 g of 1-trimethylsilyl-1,2,4-triazole (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets, as described in Example 1. The results are collated in Table 1.

EXAMPLE 3

The procedure described in Example 1 is repeated, except that 4 g of bis-N,N'-(trimethylsilyl)-piperazine (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 1.

EXAMPLE 4

The procedure described in Example 1 is repeated, except that 4 g of bis(O-trimethylsilyl)uracil (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 1.

EXAMPLE 5

The procedure described in Example 1 is repeated, except that 4 g of N,N'-bis(trimethylsilyl)urea (commercially available under the name "Silan BSU" from Wacker-Chemie GmbH) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 1.

EXAMPLE 6

A) Preparation of tetrakis(trimethylsilyl)uric acid 50.4 parts of uric acid (commercially available from Aldrich, D-Steinheim) are refluxed together with 300 parts of hexamethyldisilazane (commercially available under the name "Silan HMN" from Wacker-Chemie GmbH) and 0.2 part of ammonium sulfate until the initial evolution of ammonia has ceased (ca. 6 hours). The compound which crystallizes out overnight is dried for 2 hours in a vacuum drying cabinet at 10 mbar and 70° C. The resulting white solid melts at 117° C. The product is identified as the desired compound:

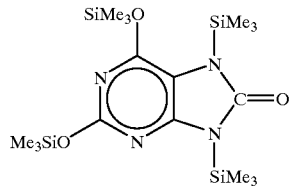

by means of $^1$H-NMR, $^{29}$Si-NMR and IR spectra and elemental analysis.

The procedure described in Example 1 is repeated, except that 4 g of tetrakis(trimethylsilyl)uric acid, the preparation of which is described above under A), are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 1.

EXAMPLE 7

A) Preparation of N,N'-bis(trimethylsilyl)-2-imidazolidinone

A mixture of 6 mol of 2-imidazolidinone (commercially available from Aldrich, D-Steinheim), 7.2 mol of hexamethyldisilazane (commercially available under the name "Silan HMN" from Wacker-Chemie GmbH) and 11 mmol of ammonium sulfate is refluxed for 3 to 4 hours, with stirring, until the initial evolution of ammonia has ceased. After the excess hexamethyldisilazane has been stripped off, the desired product is obtained in almost quantitative yield as a yellowish crystalline solid.

The procedure described in Example 1 is repeated, except that 4 g of N,N'-bis(trimethylsilyl)-2-imidazolidinone, the preparation of which is described above under A), are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 1.

EXAMPLE 8

The procedure described in Example 1 is repeated, except that 4 g of bis(O-trimethylsilyl)thymine (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 1.

EXAMPLE 9

A) Preparation of N,N'-bis(trimethylsilyl) tetrahydropyrimidinone

In a flask fitted with a reflux condenser, 10 parts of tetrahydro-2-pyrimidinone (commercially available from Aldrich, D-Steinheim) and 35.5 parts of hexamethyldisilazane (commercially available under the name "Silan HMN" from Wacker-Chemie GmbH) are refluxed for 2 hours, under catalysis with 0.5 g of ammonium sulfate, until the initial evolution of ammonia has ceased. After the excess hexamethyldisilazane has been stripped off under vacuum, the desired product is obtained as a white solid.

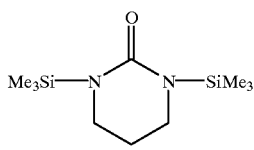

The procedure described in Example 1 is repeated, except that 4 g of N,N'-bis(trimethylsilyl)-tetrahydropyrimidinone, the preparation of which is described above under A), are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 1.

Example 10

A) Preparation of N,N'-bis(trimethylsilyl) -N,N'-di methylurea 144 parts of trimethylchlorosilane (commercially available under the name "Silan M3" from Wacker-Chemie GmbH) are added dropwise over 20 minutes to 44 parts of N,N'-dimethylurea (commercially available from Aldrich, D-Steinheim) in 180 parts of triethylamine (commercially available from Merck, D-Darmstadt), the reaction temperature not exceeding 30° C. The reaction mixture is then stirred for 24 hours at room temperature. It is filtered and the residue (triethylammonium chloride) is rinsed with toluene. The triethylamine and toluene are stripped from the filtrate at 60° C. and 70 mbar. The residual liquid is distilled at 10 Torr. According to $^1$H- and $^{29}$Si NMR, the fraction distilling at 92–96° C. is the desired product.

The procedure described in Example 1 is repeated, except that 4 g of N,N'-bis(trimethylsilyl)-N,N'-dimethylurea, the preparation of which is described above under A), are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 1.

TABLE 1

| | After preparation | | after 2 wk of storage | | after 4 wk of storage | | after 8 wk of storage | | after 12 wk of storage | |
|---|---|---|---|---|---|---|---|---|---|---|
| Example | SFT | Sh-A | SFT | Sh-A | SFT | Sh-A | SFT | Sh-A | SFT | Sh-A |
| 1 | 40 | 23 | 50 | 22 | 52 | 25 | 60 | 23 | 65 | 23 |
| 2 | 75 | 22 | 30 | 23 | 34 | 19 | 70 | 17 | 110 | 18 |
| 3 | 50 | 24 | 95 | 22 | 115 | 23 | 115 | 22 | 105 | 20 |
| 4 | 110 | 18 | 110 | 20 | 120 | 22 | 120 | 19 | 120 | 17 |
| 5 | 11 | * | 9 | 10 | 5 | 11 | 9 | 10 | 20 | 13 |
| 6 | 9 | 12 | 15 | 24 | 15 | 21 | 17 | 23 | 15 | 22 |
| 7 | 30 | 17 | 45 | 15 | 42 | 16 | 45 | 15 | 50 | 15 |
| 8 | 200 | 19 | 190 | 20 | 195 | 18 | 160 | 20 | 120 | 19 |
| 9 | 5 | 22 | 7 | 25 | 8 | 25 | 10 | 24 | 9 | 22 |
| 10 | 20 | 21 | 10 | 23 | 13 | 21 | 13 | 22 | 12 | 23 | wk: weeks;
SFT: skin formation time in minutes;
Sh-A; Shore-A hardness;
*: not determined.

Comparative Example 1

The procedure described in Example 1 is repeated, except that 4 g of N,N-bis(trimethylsilyl)methylamine (commercially available from Fluka, CH-Buchs) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 2

The procedure described in Example 1 is repeated, except that 4 g of N-trimethylsilylmorpholine (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 3

The procedure described in Example 1 is repeated, except that 4 g of N,O-bis(trimethylsilyl)hydroxylamine (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 4

The procedure described in Example 1 is repeated, except that 4 g of 2-(trimethylsiloxy)furan (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 5

The procedure described in Example 1 is repeated, except that 4 g of trimethylsilylpyrrolidine (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 6

The procedure described in Example 1 is repeated, except that 4 g of trimethylsilylacetonitrile (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 7

The procedure described in Example 1 is repeated, except that 4 g of bis(trimethylsilyl)carbodiimide (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 8

The procedure described in Example 1 is repeated, except that 4 g of trimethylsilylpiperidine (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 9

The procedure described in Example 1 is repeated, except that 4 g of tris(trimethylsilyl)ketenimine (commercially available from ABCR, D-Karlsruhe) are stirred into the composition instead of 4 g of 3-trimethylsilyl-2-oxazolidinone.

The composition prepared in this way is filled into airtight tribes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 10

The procedure described in Example 1 is repeated, except that 4 g of tris(trimethylsilyl) phosphate (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 11

The procedure described in Example 1 is repeated, except that 4 g of trimethylsilyl methacrylate (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 12

The procedure described in Example 1 is repeated, except that 4 g of 2-trimethylsilylethanol (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 13

The procedure described in Example 1 is repeated, except that 4 g of bis(trimethylsilyl)acetamide (commercially assailable under the name "Silan BSA" from Wacker-Chemie GmbH) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 14

The procedure described in Example 1 is repeated, except that 4 g of ethyltrimethylsilyl acetate (commercially available from ABCR, D-Karlsruhe) are stirred into the composition instead of 4 g of 3-tri-methylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 15

The procedure described in Example 1 is repeated, except that 4 g of N-methyl-K-trimethylsilylacetamide (commercially available from Fluka, CH-Buchs) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

Comparative Example 16

The procedure described in Example 1 is repeated, except that 4 g of (isopropenyloxy)trimethylsilane (commercially available from ABCR, D-Karlsruhe) are stirred into the composition instead of 4 g of 3-trimethylsilyl-2-oxazolidinone.

The composition prepared in this way is filled into airtight tubes and stored at 50° C.

Immediately after preparation and after 2, 4, 8 and 12 weeks of storage, beads are used to determine the skin formation time (time up to the formation of a dry surface of the bead) and the Shore-A hardness is determined using 2 mm thick sheets. The results are collated in Table 2.

TABLE 2

| Example C = Comparative | After preparation | | after 2 wk of storage | | after 4 wk of storage | | after 8 wk of storage | | after 12 wk of storage | |
|---|---|---|---|---|---|---|---|---|---|---|
| | SFT | Sh-A | SFT | Sh-A | SFT | Sh-A | SFT | Sh-A | SFT | Sh-A |
| C1 | 20 | 21 | 60 | 18 | 6000 | — | n.v. | — | n.v. | — |
| C2 | 15 | 19 | 70 | 20 | 20 | — | n.v. | — | n.v. | — |
| C3 | 25 | 22 | 6000 | — | 6000 | — | n.v. | — | n.v. | — |
| C4 | 70 | 19 | 60 | 21 | 120 | 20 | 300 | 15 | 500 | 10 |
| C5 | 45 | 23 | 80 | 18 | 120 | 15 | 300 | 10 | 1000 | 7 |
| C6 | 30 | 20 | 150 | 17 | 210 | 16 | 400 | 13 | 320 | 10 |
| C7 | 200 | 5 | 250 | 5 | 300 | 4 | 450 | — | 190 | — |
| C8 | 40 | 24 | 85 | 15 | 120 | 13 | 420 | 10 | 1000 | 6 |
| C9 | 180 | 13 | 300 | 15 | 800 | 14 | 280 | 13 | 380 | 10 |
| C10 | n.v. | — | n.v. | — | n.v. | — | n.v. | — | n.v. | — |
| C11 | 65 | 10 | 240 | 6 | 800 | 4 | n.v. | — | n.v. | — |
| C12 | 11 | 30 | n.v. | — | n.v. | — | n.v. | — | n.v. | — |
| C13 | 60 | 22 | 40 | 23 | 50 | 20 | 30 | 17 | n.v. | — |
| C14 | 60 | 24 | 30 | 19 | n.v. | — | n.v. | — | n.v. | — |
| C15 | 35 | 25 | 30 | 23 | 20 | 20 | n.v. | — | n.v. | — |
| C16 | 25 | 21 | 20 | — | n.v. | — | n.v. | — | n.v. | — | wk; weeks;
SFT: skin formation time in minutes;
Sh-A: Shore-A hardness;
n.v.: no vulcanization within 7 days.

What is claimed is:

1. An organopolysiloxane composition storable in the absence of moisture and which is crosslinkable to form elastomers in the presence of moisture at room temperature with the elimination of alcohols, said composition being based on (A) polydiorganosiloxanes with at least two organyloxy radicals on each end group; optionally, (B) organyloxy-functional crosslinking agents with at least three organyloxy groups; optionally, (C) condensation catalysts; and at least one compound (D) selected from ($D_a$) compounds of the general formula

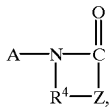
(Ia)

($D_b$) compounds with a substituted or unsubstituted 1,2,4-triazol-1-yl radical of the formula

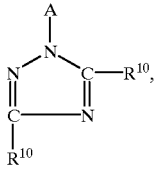
(Ib)

($D_c$) compounds with a substituted or unsubstituted piperazinediyl radical of the formula

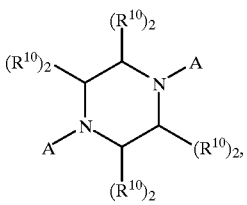
(Ic)

($D_d$) O-silylated substituted or unsubstituted hydroxypyrimidines, ($D_e$) compounds of the formula

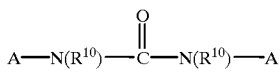
(Ie)

and ($D_f$) silylated substituted or unsubstituted hydroxypurines, in which

Z is =N—A or —O—, $R^4$ is a divalent hydrocarbon radical having 1 to 16 carbon atoms which is unsubstituted or substituted by halogen atoms, amino groups, ether groups or ester groups, A are identical or different radicals 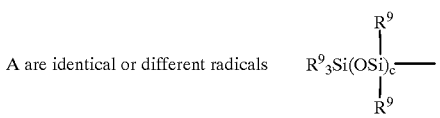

in which each $R^9$ can be identical or different and are SiC-bonded monovalent hydrocarbon radicals having 1 to 12 carbon atoms which are unsubstituted or substituted by halogen atoms, amino groups, ether groups, ester groups, epoxy groups, mercapto groups, cyano groups or (poly)glycol radicals comprising oxyethylene and/or oxypropylene units, or an organosiloxy radical, with c being 0 or an integer from 1 to 20, and $R^{10}$ are identical or different and are a hydrogen atom or hydrocarbon radicals having 1 to 8 carbon atoms which are unsubstituted or substituted by halogen atoms, amino groups, ether groups or ester groups.

2. An organopolysiloxane composition as claimed in claim 1, wherein the polydiorganosiloxanes with at least two organyloxy radicals on each end group are those of the general formula

(II)

in which a is 0 or 1,

R are identical or different SiC-bonded hydrocarbon radicals having 1 to 18 carbon atoms which are unsubstituted or substituted by halogen atoms, amino groups, ether groups, ester groups, epoxy groups, mercapto groups, cyano groups or (poly)glycol radicals comprising oxyethylene and/or oxypropylene units, $R^1$ are identical or different and are a hydrogen atom or R, $R^2$ are identical or different and are a hydrocarbon radical having 1 to 18 carbon atoms which is unsubstituted or substituted by amino, ester, ether, keto and halogen groups and which can be interrupted by oxygen atoms, and n is an integer from 10 to 10,000.

3. An organopolysiloxane composition as claimed in claim 1, wherein the O-silylated substituted or unsubstituted hydroxypyrimidines ($D_d$) are compounds of the formula

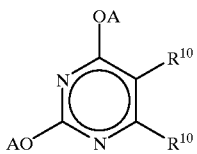
(Id)

in which A and $R_{10}$ are as defined in claim 1.

4. An organopolysiloxane composition as claimed in claim 1, wherein the silylated substituted or unsubstituted hydroxypurines ($D_f$) are compounds of the formula

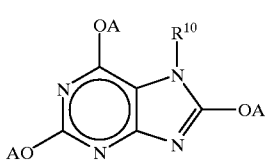
(If)

in which A and $R^{10}$ are as defined in claim 1.

5. An organopolysiloxane composition as claimed in claim 1, wherein the compound (D) is selected from the group consisting of N-trimethylsilyl-2-oxazolidinone, N,N-bis(trimethylsilyl)-2-imidazolidinone, $(CH_3)_2(CH_2=CH)Si[OSi(CH_3)_2]_3$—NH—CO—NH—$[(CH_3)_2SiO]_3Si(CH=CH_2)$—$(CH_3)_2$, $(CH_3)_3Si$—NH—CO—NH—Si$(CH_3)_3$ and mixtures thereof.

6. An organopolysiloxane composition as claimed in claim 1, which contains the compound (D) in amounts of about 0.1 to about 10 parts by weight, based on about 100 parts by weight of organopolysiloxane (A).

7. An organopolysiloxane composition as claimed in claim 2, which comprises (A) a polydiorganosiloxane of the formula (II),
(B) a crosslinking agent,
(C) a condensation catalyst,
(D) one or more compounds selected from ($D_a$) to ($D_f$).

8. An organopolysiloxane composition as claimed in claim 2, which consists of (A) 100 parts by weight of polydiorganosiloxane of the formula (II),
(B) 0.1 to 50 parts by weight of crosslinking agent of the formula $(R^2O)_{4-m}SiR_m^3$,
(C) 0.01 to 10 parts by weight of metalorganic condensation catalyst,
(D) 0.1 to 10 parts by weight of a compound selected from ($D_a$) to ($D_f$),
(E) 0 to 300 parts by weight of plasticizers,
(F) 0 to 300 parts by weight of fillers,
(G) 0 to 50 parts by weight of coupling agents and
(H) 0 to 100 parts by weight of additives.

9. A process for the preparation of the organopolysiloxane compositions as claimed in claim 1, wherein the components are mixed together in any order.

10. An elastomer prepared by crosslinking an organopolysiloxane composition as claimed in claim 1.

* * * * *